United States Patent [19]

Kearney

[11] Patent Number: 5,893,399
[45] Date of Patent: Apr. 13, 1999

[54] MECHANISM FOR REDUCING EMISSIONS OF DUST FROM GRAIN BINS

[75] Inventor: Ken Kearney, Alpha, Ill.

[73] Assignee: Agricultural Building Company, Mendota, Ill.

[21] Appl. No.: 08/995,318

[22] Filed: Dec. 22, 1997

[51] Int. Cl.[6] .................................................. B65G 3/04
[52] U.S. Cl. .......................... 141/286; 141/192; 414/291; 414/292; 414/303; 414/376; 414/572
[58] Field of Search .......................... 141/192, 286; 414/291, 292, 303, 376, 572; 193/3, 32; 49/51, 74.1, 77.1, 80.1

[56] References Cited

U.S. PATENT DOCUMENTS

| | | | |
|---|---|---|---|
| 135,683 | 2/1873 | Atkinson | 414/572 |
| 510,206 | 12/1893 | Bode | 414/572 |
| 1,433,644 | 10/1922 | Palmer | 414/580 |
| 1,676,307 | 7/1928 | Winter | 414/303 |
| 1,877,066 | 9/1932 | Shadle | 414/303 |
| 3,417,883 | 12/1968 | Felts | 414/303 |
| 4,324,524 | 4/1982 | Burston et al. | 414/291 |
| 4,942,911 | 7/1990 | Herbert | 414/291 |
| 5,544,686 | 8/1996 | Kearney | 141/192 |

*Primary Examiner*—J. Casimer Jacyna
*Attorney, Agent, or Firm*—Rockey, Milnamow & Katz, Ltd.

[57] ABSTRACT

A mechanism for hindering the escape of grain dust from a grain bin, including baffle units having diagonally extending barrier members and vertically oriented baffle members. First and second sloped side walls of the bin, a cover, and a curtain confine the circulation of dust to portions of the bin remote from the baffle units to thereby hinder the escape of dust from the bin. Metering and dump units can be combined with the baffle units to allow operation of a single grain bin in both the high and low flow rate modes of operation.

29 Claims, 7 Drawing Sheets

MECHANISM FOR REDUCING EMISSIONS OF DUST FROM GRAIN BINS

BACKGROUND OF THE INVENTION

1) Field of the Invention

This invention relates to mechanisms designed to reduce the amount of dust emitted from a grain bin when grain from a truck or rail car is dumped into the grain bin.

2) Related Art

It is known to provide grain bins which receive grain dumped from a truck or rail car. These grain bins typically include a grate which forms a covering over the top opening of the grain bin. The truck is driven onto the grate such that the outlet of the truck is positioned over the grate, and the contents of the truck are emptied from the truck through the outlet. The grain being dumped from the truck falls through the grate and into the grain bin. The falling grain tends to generate a large amount of dust as it falls through the grate and into the bin. This dust tends to rush up through the grate and into the atmosphere as the falling grain displaces the air and dust within the bin. Several design efforts have been directed at reducing or eliminating the dust exiting the grain bin. One such mechanism designed to reduce emissions of dust from grain bins provides a plurality of vents positioned across the opening at the top of the grain bin. The vents are in a closed position until grain from the truck or rail car contacts the vents, at which time the vents open under the weight of the grain to allow the grain to fall into the bin. These mechanisms also include blower fans which suck air and dust from the grain bin in large quantities and direct the air and dust through a filter. The filter blocks the dust particles from passing into the atmosphere. These devices prevent a portion of the dust from entering the atmosphere. These devices tend not to function well when the filters become clogged, at which time the dust tends to boil upwardly through the vents and into the atmosphere. The filters and blower fans have the further disadvantage of requiring an undesirable amount of maintenance.

Also, these devices tend not to function in an acceptable manner when grain is dumped into the bin at relatively large flow rates. When grain is dumped from a truck through a small outlet door in the truck, the flow rate of grain being dumped is relatively low. Since the flow rate is low, the rate at which air is being displaced from the grain bin by the flow of dumped grain is also relatively low. The blower fans have large enough capacity to suck off the air and dust being displaced by the inflow of grain. But when relatively large flow rates of grain occur the rate at which air and dust is displaced by the inflow of grain correspondingly increases, and many prior art blower mechanisms are not large enough to accept the large rates of flow of displaced air and dust. These large flow rates are experienced, for example, when a truck is unloaded by tilting the bed of the truck upwardly and opening the entire rear wall or tailgate of the truck. Since the outlet of the truck is the entire rear wall or tailgate of the truck, the rate of flow of grain from the truck is relatively large in comparison to the rate of flow through a smaller outlet or opening in a wall of the truck.

Another dust reducing mechanism is described in detail in U.S. Pat. No. 5,544,686. That invention provides a plurality of metering units positioned across the opening in the top of the grain bin. The metering units include louvers that have open and closed positions. The metering units also include a sensor which senses the presence of the grain on the closed louvers. After the sensor senses the presence of grain on the closed louvers, a timer will operatively open the metering unit's louvers after a predetermined amount of time. The delay in opening the louver allows a pile of grain to accumulate on top of the louver before the louver opens. The quantity of grain on top of the louver is greater than can pass through the louver at one time, and therefore when the louver is opened, grain will begin falling through the louvers but the pile will remain above the louver.

When the louver is open by action of the sensor, enough grain will have accumulated on top of the louver to establish a choke load in the metering unit that is sufficient to block any air from rising up through the louver as the choke load of grain passes by the louver. The quantity of grain passing through the louver is sufficient to generally fill the entire opening of the louver, and therefore dust within the grain bin will be blocked from rising up through the open louver. This device operates well when the flow rate of grain from a truck is relatively low, such as when the grain is dumped from the truck through a relatively small outlet.

However, when the grain is dumped at a relatively large flow rate, such as when the entire tailgate of the truck is opened and the bed of the truck is tilted up to unload the truck, this device will cause a very large pile of grain to accumulate above the louvers. The metering units only allow grain through the louvers at a certain rate of flow, and when the flow rate out of the truck greatly exceeds the maximum flow rate that can pass through the louvers then a relatively large pile of grain will accumulate on top of the metering units. The truck may be emptied at such a quick rate that the resulting pile would be wider than the opening in the top of the grain bin. This would require manually shoveling or sweeping the grain back on top of the grain bin. It would be generally impractical to build a bin with a large enough opening and with enough metering units to accommodate the high flow rates resulting from dumping a large truck with the entire tailgate open.

It would therefore be desirable to provide a mechanism for reducing the amount of dust emitted from a grain bin when the grain is being dumped at relatively high flow rates such as when grain is dumped from a truck with the entire tailgate open and the truck bed tilted up. It would be desirable for such a mechanism to reduce emissions of grain dust during both high and low flow rate modes of operation. It would also be desirable for such a mechanism to be adapted for use with dust reduction mechanisms utilizing metering units as described above.

BRIEF SUMMARY OF THE INVENTION

The present invention provides a plurality of baffle units extending across the top opening of a grain bin. The baffle units include a diagonally extending barrier member that directs falling grain into contact with a vertically oriented baffle member. The baffle member is in the vertical orientation when in a closed mode. The top portion of the baffle member is positioned directly beneath a portion of a barrier member, and the lower portion of the baffle member is positioned proximate or in abutment with another adjacent barrier member when the baffle member is in a vertically oriented closed position. The weight of the baffle member biases the baffle member back to this vertical closed position. As falling grain contacts the baffle member the baffle member will swing open allowing the grain to fall into the bin between the baffle member and the adjacent barrier member. In one embodiment of the present invention the baffle units are positioned across a first portion of the opening in the grain bin which is directly above a first sloped side wall of the bin. After the falling grain passes through the baffle units it will continue falling downwardly into contact with the first sloped side wall and downwardly out a bottom opening of the bin. Dust generated by the falling grain within the bin will travel to the left within the bin and be directed upwardly by contact with a second sloped side wall of the bin. The upwardly traveling dust will contact a cover that extends over a second portion of the opening in the grain bin. The dust will then travel to the right into contact with a curtain extending down between the first and second portions of the opening. The curtain generally blocks the dust from travelling back toward the baffle units where the dust might exit the bin and enter the environment. The grain dust is therefore generally contained in the left side of the bin where it can circulate remote from the baffle units. Grain dust is therefore generally hindered from exiting the bin by the present invention.

In an alternative embodiment of the present invention a plurality of metering and dump units are positioned to form a layer directly above a plurality of baffle units in the top opening of the bin. In this embodiment grain can be dumped from a truck at low flow rates such as through a small discharge opening of a grain truck. This grain falls onto the metering units and is sensed by a grain sensor. The sensor will cause louvers of the metering unit to open a predetermined period of time after the grain contacts the louver, and the opened louver will let the grain fall downwardly. The grain will then fall downwardly into contact with the baffle units, which allow the grain to fall downwardly further into the bin. The operation of the metering units, dump units and sensors in this mode of operation establishes a choke load of grain passing through the metering units such that grain dust within the bin is blocked from exiting the bin via the metering units. This alternative embodiment can also be utilized when dumping grain at high flow rates such as when grain is dumped through an open tailgate of a truck. The metering and dump units that cover a second portion of the top opening of the bin are maintained in their closed configurations. The metering and dump units that are positioned over the baffle units in the first portion of the top opening of the bin are maintained in their open mode to allow grain to freely fall down into contact with the baffle units. A curtain extends downwardly between the first and second portions of the opening. In this mode of operation the grain will travel downwardly through the baffle units, against the first sloped side wall and downwardly through the bottom opening in the grain bin. The dust generated within the bin will travel to the left, be directed upwardly by contact with the second sloped side wall, and will be generally prevented or blocked from traveling upwardly through the second portion of the bin's top opening by the closed metering and dump sections. Grain dust is thereby generally prevented from exiting the bin. This embodiment therefore allows a single grain bin to be operated in both high and low grain flow rate modes of operation.

DETAILED DESCRIPTION OF THE INVENTION

Figure 1:
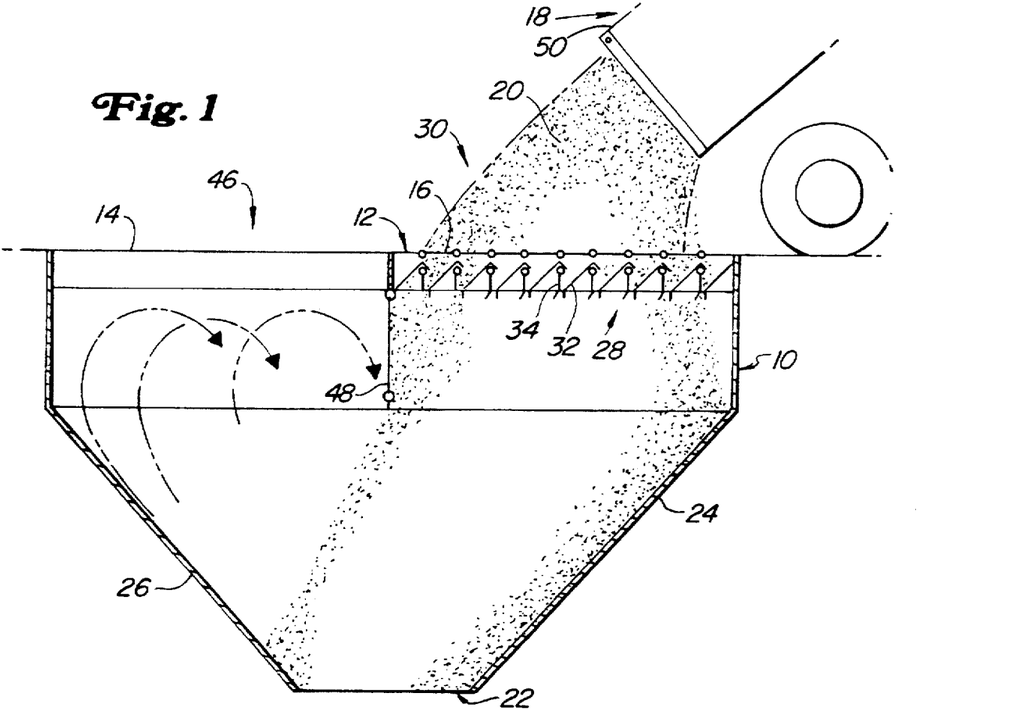
FIG. 1 is a schematic side view of a dust emission reducing device for a grain bin according to the present invention.

Referring now to FIGS. 1–11, there is shown the dust reduction mechanism according to the present invention. A grain bin 10 as shown in FIG. 1 has a top opening 12 across which a cover portion 14 and grate 16 is positioned. A grain truck 18 can be driven across the cover 14 and grate 16 and the grain 20 in the truck 18 dumped onto the grate 16 so that the grain 20 falls into the grain bin 10. The grain bin 10 includes a bottom opening 22 through which the grain 20 within the bin 10 passes into other collection containers such as rail cars. The grain bin 10 includes first and second side walls 24 and 26 having lower portions that slope inwardly for directing the grain 20 toward the centrally located bottom opening 22.

Figure 4:
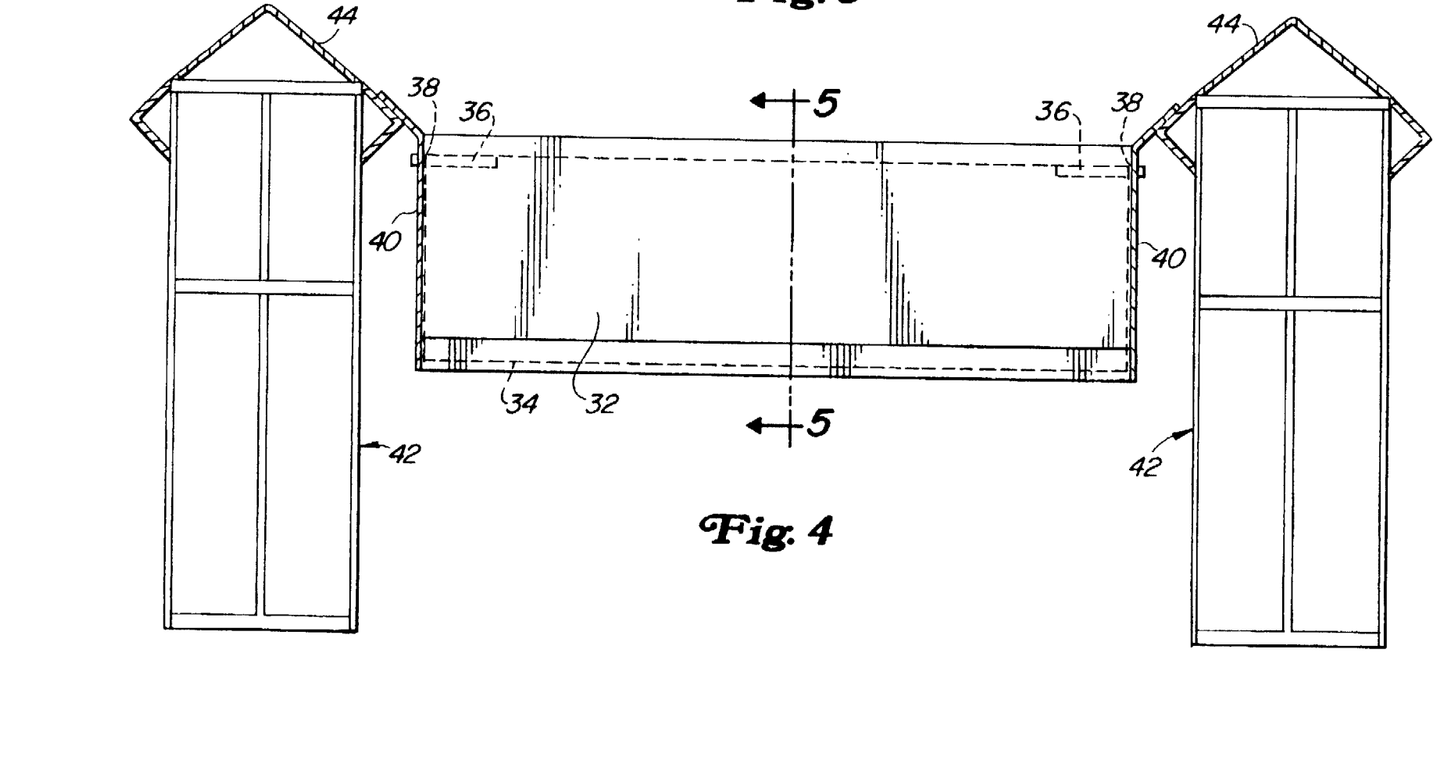
FIG. 4 is a close up view of the baffle sections shown in FIG. 3.
Figure 5:
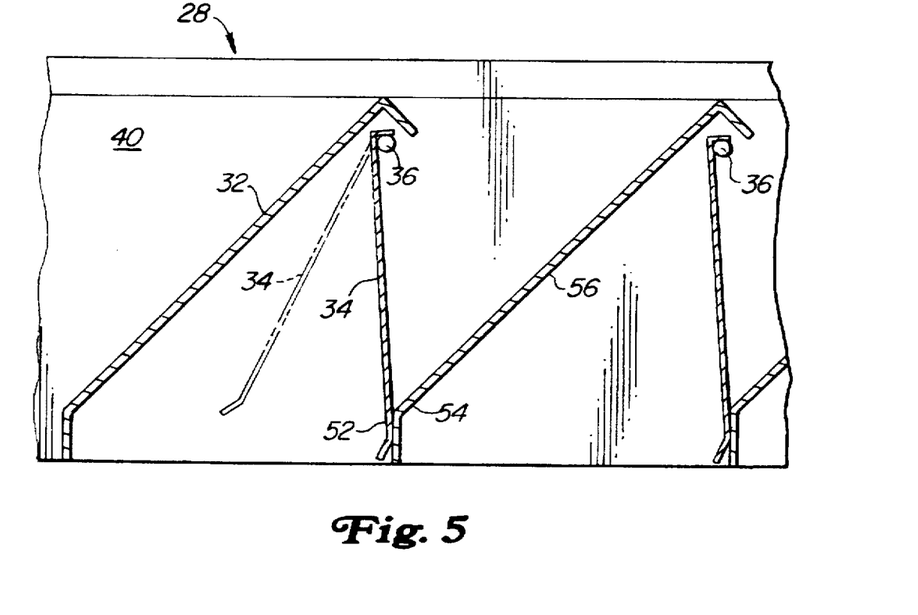
FIG. 5 is a sectional view of a baffle section of FIG. 4 taken along line 5—5.

A plurality of baffle units 28 are positioned across a first portion 30 of the grain bin opening 12 located directly beneath the grate 16. The baffle units 28 are positioned generally directly over the sloped portion of the first side wall 24 of the grain bin 10. The baffle units 28 each include a stationary slide plate or barrier member 32 that extends at an angle to the horizontal, as is best seen in FIG. 5. A swingable baffle member 34 is also provided which extends generally vertically when in the closed position, as shown in solid lines in FIG. 5, and swings to an angled position when in an open mode as shown in broken lines in FIG. 5. Fixed to each baffle member 34 are a pair of rod members 36 located at the top corners of the baffle members 34, as best seen in FIGS. 4 and 5. The rod members 36 define a pivot axis about which the baffle 34 swings between its open and closed positions. The rod members 36 are pivotably received within openings 38 formed in side plates 40 that are fixed with frame structures 42 as seen in FIG. 4. The frame structures 42 include crested top portions 44 which direct falling grain 20 toward respective baffle units 28.

Figure 2:
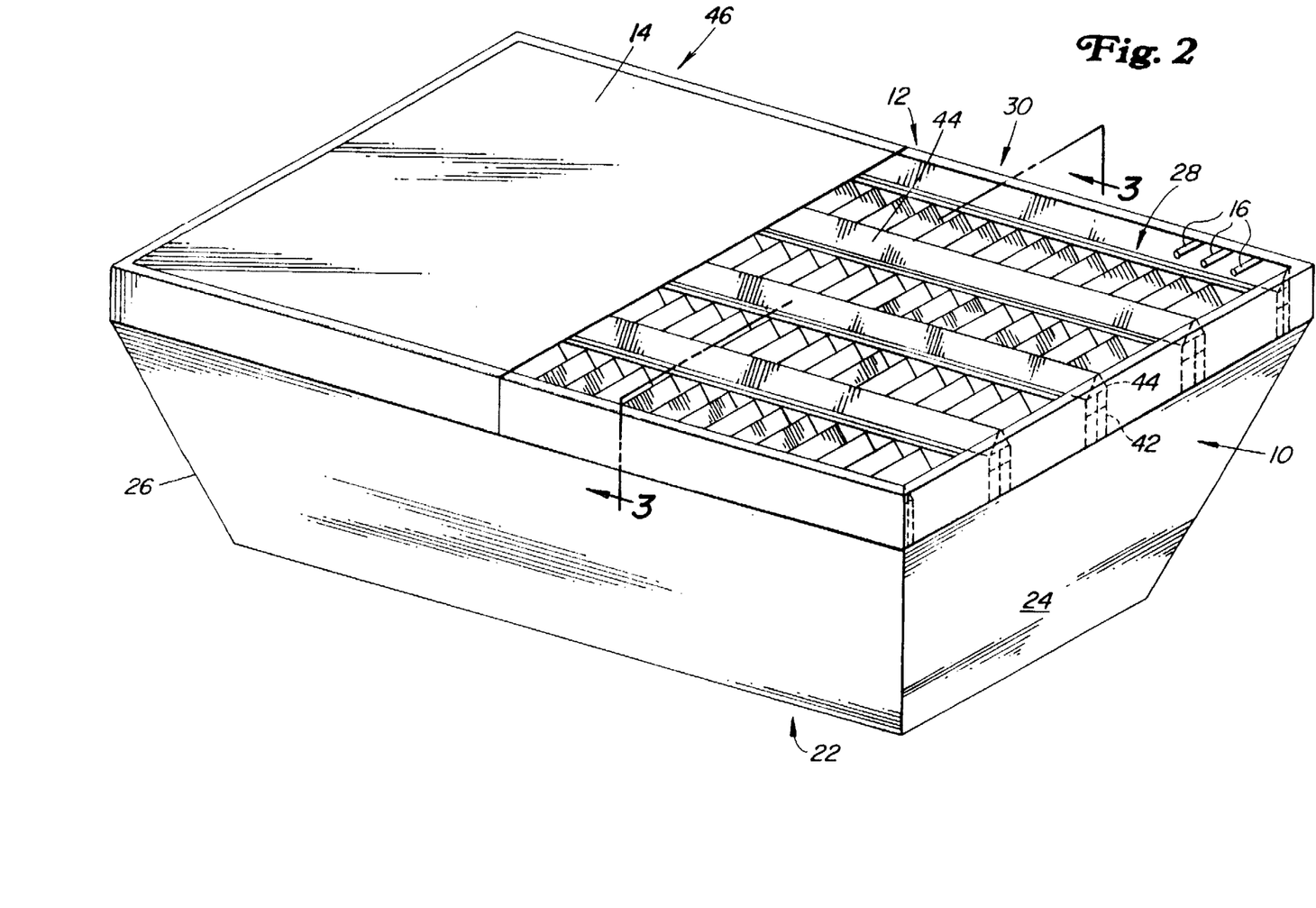
FIG. 2 is a perspective view of the dust emission reducing mechanism of FIG. 1.
Figure 3:
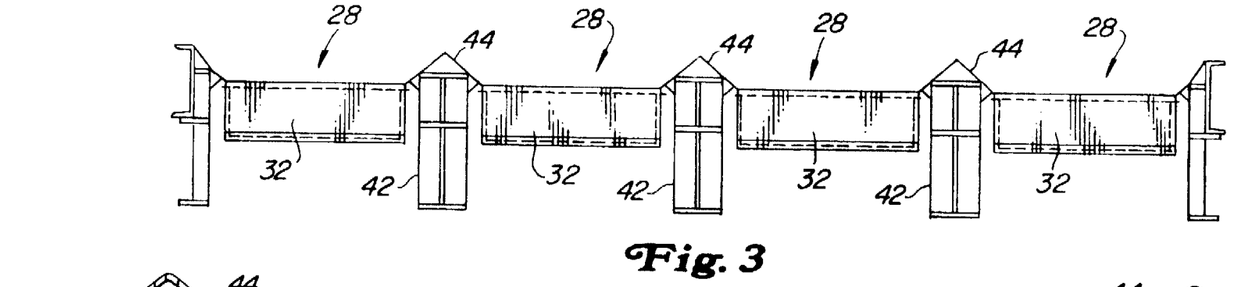
FIG. 3 is a sectional view of the mechanism of FIG. 2 taken along line 3—3.

In one embodiment of the present invention as shown in FIGS. 1 and 2, the baffle units 28 are positioned across a first portion 30 of the grain bin opening 12 which is positioned over the sloped portion of the first side wall 24 of the grain bin 10, and a cover 14 extends across the remainder or second portion 46 of the top opening 12 of the grain bin 10. In this embodiment, a curtain 48 extends generally vertically downwardly at a location directly between the baffle units 28 and the cover 14. The operation of the baffle units 28, cover portion 14 and curtain 48 act together to generally reduce emissions of grain dust from the grain bin 10, as described below.

Next, the operation of the embodiment of the present invention shown in FIGS. 1 and 2 will be described in greater detail. During operation of the present invention, a truck 18 loaded with grain 20 is driven across the grate 16 and into position so that the contents of the truck 18 can be unloaded onto the baffle units 28. Once in position, the truck's tailgate is opened and the bed 50 of the truck 18 is tilted to dump the grain 20 from the truck 18 onto the baffle units 28. The grain 20 flows out of the truck 18 at a relatively high flow rate since the opening at the rear of the truck 18 created by the open tailgate is relatively large. As the falling grain 20 contacts the baffle units 28, the grain will contact the crested top members 44 and fixed barrier members 32 and slide downwardly diagonally into contact with the swingable baffle members 34. Individual baffle members 34 will then swing open due to the force imparted from falling grain 20, thereby allowing the grain 20 to pass downwardly into the grain bin 10. If grain is not striking a particular baffle 34, then that particular baffle 34 will not swing to the open mode. When grain stops contacting a particular baffle 34, the weight of the baffle 34 will cause the baffle 34 to swing back to its vertically aligned position. In the vertically oriented position the lower portion 52 of the baffle 34 will contact the lower portion 54 of another adjacent barrier member 56 and generally form a seal therewith. In the vertical or closed position, the lower portion 52 of the baffle 34 will therefore be generally flush against the lower portion 54 of the adjacent barrier member 56 such that grain dust within the bin 10 will be generally blocked from rising up past the baffle 34 and adjacent barrier members 56. The upper portion 58 of the baffle 34 is positioned in close proximity beneath a portion of a barrier member 32 such that dust will also be hindered from flowing upwardly past the baffle 34 in that location. As the grain 20 falls through the baffles 34 it will drop downwardly within the grain bin 10. The grain 20 enters the bin 10 through the baffle units 28, which are positioned generally directly above the sloped first side wall 24 of the bin 10, and therefore the grain 20 tends to fall into contact with the sloped first side wall 24. The curtain 48 helps confine the downward flow of grain 20 through the baffles 28 such that the grain 20 will contact the first sloped side wall 24. As the grain 20 contacts the first sloped side wall 24 it will continue traveling downwardly and out through the bottom opening 22 of the grain bin 10. Dust will be created by the falling grain 20 and by the contact of the grain 20 against the first sloped side wall 24. This dust will tend to travel to the left within the bin 10 as shown by arrows A in FIG. 1. The dust is generally prevented from traveling straight upwardly through the open baffle units 28 by the presence of the high volume of grain traveling downwardly through the baffles 28. This causes the dust to tend to travel to the left within the bin 10 as the grain 20 strikes the first sloped side wall 24. As the dust travels to the left within the bin 10 if tends to contact the second sloped side wall 26, which tends to direct or deflect the dust upwardly. The second portion 46 of the opening 12 which is directly above the second sloped side wall 26 is generally blocked by the presence of the cover 14, and therefore the rising dust is blocked from traveling further upwardly through the second portion 46 of the opening 12 and out of the bin 10. The dust tends to circulate to the right after striking the cover 14, and the curtain 48 generally deflects the dust downwardly again to block the dust from traveling near the baffles 28. In this way the configuration of the present invention causes the dust to circulate within the bin 10 in areas of the bin 10 that are remote from the baffle units 28 through which grain 20 is being dumped into the bin 10. The dust is thereby generally hindered from flowing upwardly through the baffles units 28. This, in combination with the construction of the baffle units 28 which tends to block dust from flowing upwardly past the baffle members 34 when the baffle units 28 are closed, reduces emissions of grain dust from the bin 10.

Figure 6:
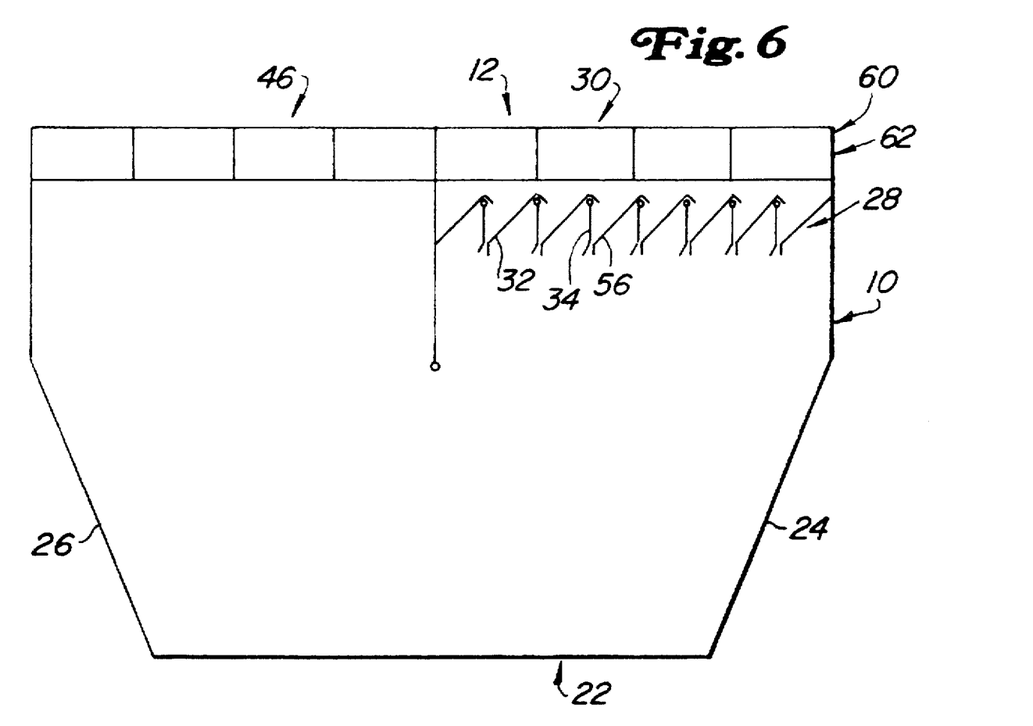
FIG. 6 is an alternative embodiment of the present invention having a layer of metering and dump units positioned directly above a plurality of baffle units across the top opening of the grain bin.
Figure 7:
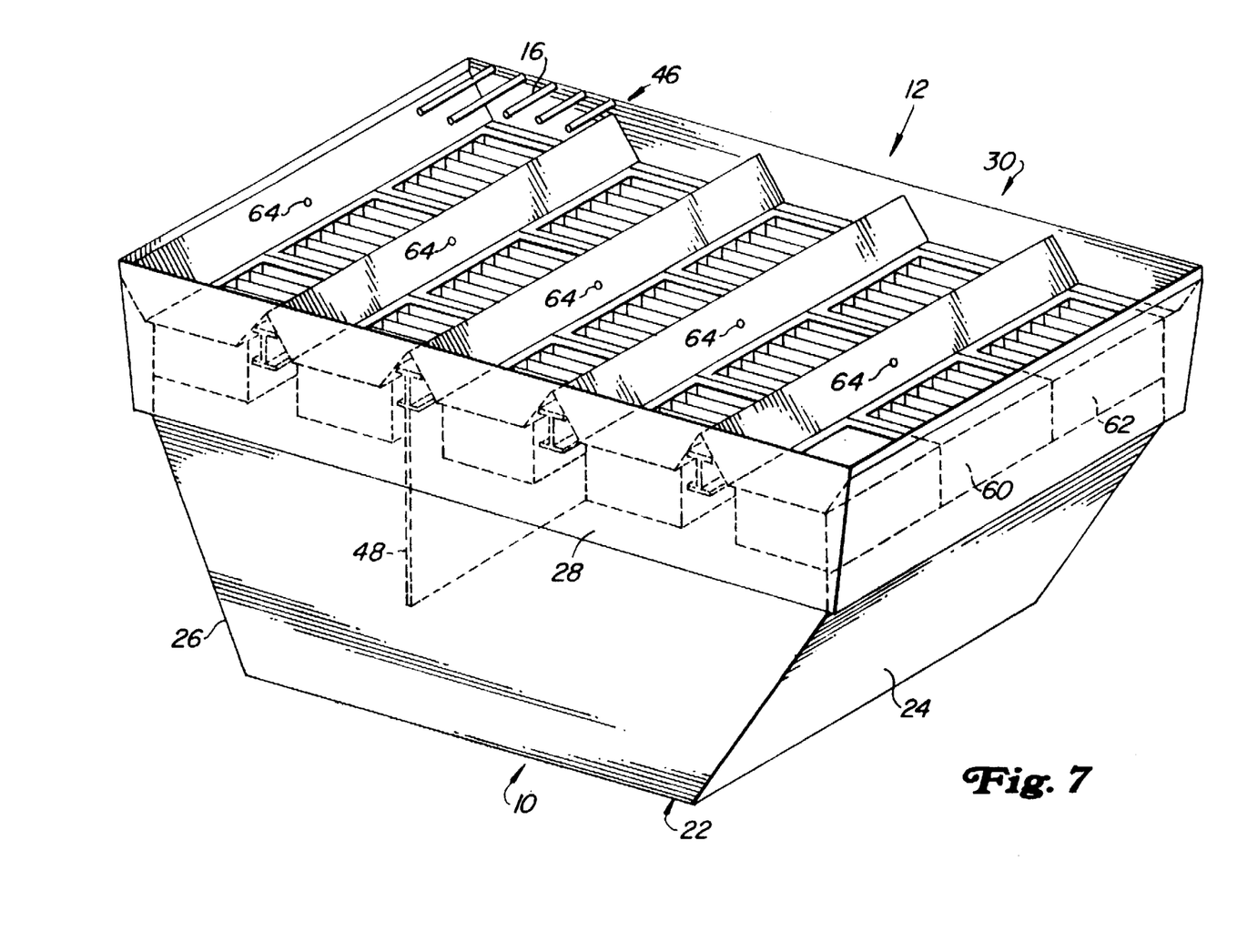
FIG. 7 is perspective view of the alternative embodiment of FIG. 6.
Figure 8:
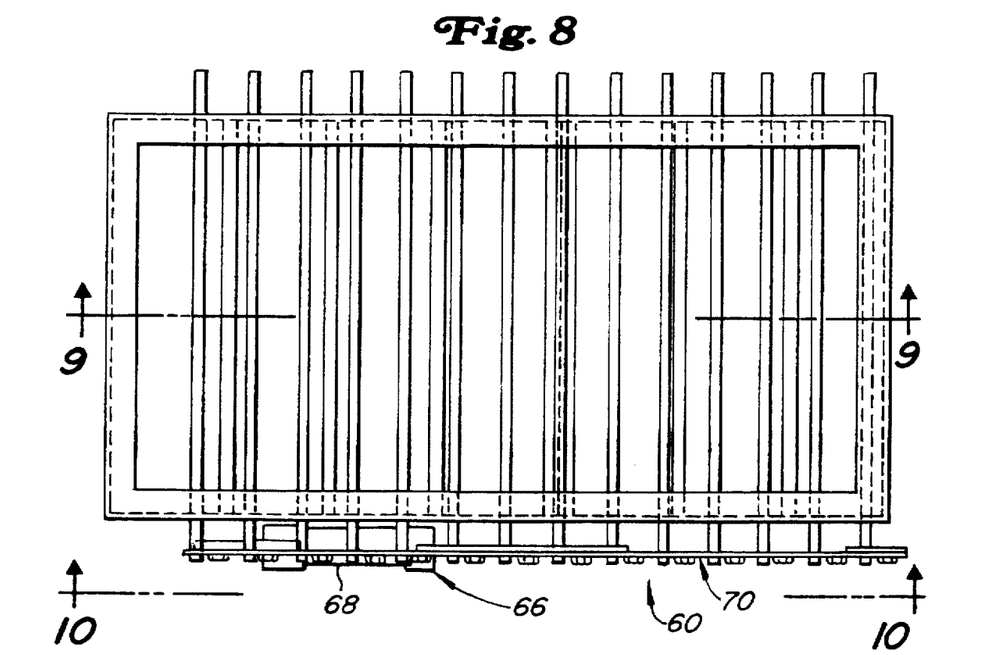
FIG. 8 is a top view of a metering unit of the embodiment shown in FIG. 6.
Figure 9:
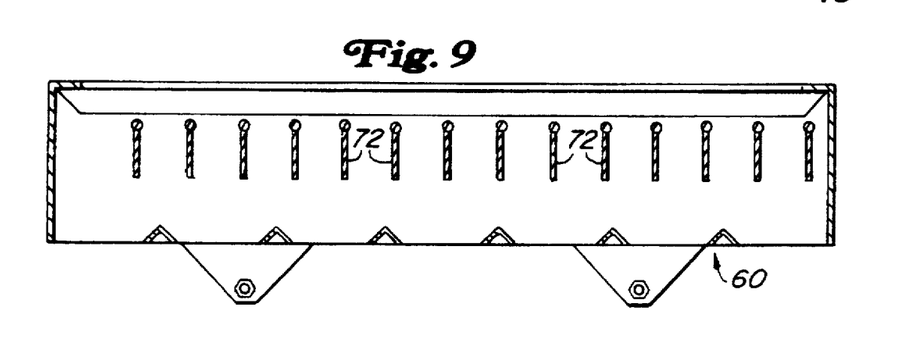
FIG. 9 is a sectional view of the metering unit of FIG. 8 taken along line 9—9.
Figure 10:
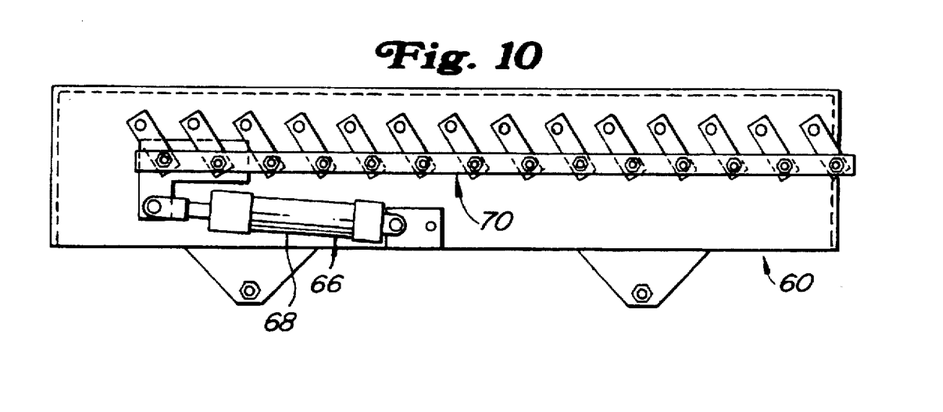
FIG. 10 is a side view of the metering unit of FIG. 8 taken along line 10—10.

In an alternative embodiment as shown in FIGS. 6 and 7, baffle sections 28 are positioned in the first portion 30 of the top opening 12 in the bin 10 directly above the first sloped side wall 24 of the bin 10. The baffle sections are not provided across the second portion 46 of the top opening 12. A layer of metering units 60 and dump sections 62 as described in greater detail in U.S. Pat. No. 5,544,686, which is incorporated herein by reference, form a layer that extends across both the first and second portions 30 and 46 of the top opening 12 of the bin 10 directly above the baffle units 28. When it is desired to unload grain 20 from a truck 18 through a relatively small opening in the truck 18 such that the flow rate of grain is relatively low, the metering units 60 and dump sections 62 can be utilized as described in U.S. Pat. No. 5,544,686. Grain piles up on the closed metering sections 60 until a choke load has accumulated, and then the sensor 64 sends a signal to an opening mechanism 66 such as a hydraulic cylinder 68 and linkage 70 shown in FIGS. 8–10 which will then cause louvers 72 to open, thereby generally opening the metering units 60. The amount of grain traveling through the metering unit 60 is so great that dust is unable to flow upwardly through the open metering unit 60. Grain that flows through metering units 60 located directly above the baffle units 28 will contact the baffle units 28 and continue to flow downwardly through the baffle units 28. This grain will contact the baffle units 28, causing the baffle members 34 to swing open for allowing the grain to pass by. The presence of the baffle units 28 does not hinder or interfere with the operation of the metering or dump units 60 or 62 when operating in this mode. Once all the grain has been emptied from the truck in this mode of operation, all the louvers 72 of the metering units 60 and the dump units 62 are opened momentarily so that any grain that remains on top of any closed louvers 72 will fall into the bin 10.

This alternative embodiment shown in FIGS. 6 and 7 also allows grain to be unloaded from a truck 18 at relatively high flow rates such as when the truck's tailgate is opened and the bed 50 of the truck 18 is tilted up to rapidly dump the contents. In this mode of operation the metering and dump units 60 and 62 positioned in the first portion 30 of the bin opening 12 directly above the baffle sections 28 are opened, and the remainder of the metering and dump units 60 and 62 in the second portion 46 of the bin opening 12 are maintained in their closed positions. In this mode, the closed metering and dump units 60 and 62 positioned across the second portion 46 of the bin opening 12 act as a cover or barrier for covering the second portion 46 of the bin's top opening 12 that is not directly above the baffle units 28. Grain is rapidly dumped from the truck 18 onto the open metering and dump units 60 and 62 in the first portion 30 of the bin opening 12. The grain will fall through the open metering and dump units 60 and 62 immediately and will then continue to fall downwardly into contact with the baffle units 28. As the grain contacts the baffle units 28, the weight of the grain will cause the baffle members 34 to swing to their open positions such that the grain is allowed to pass between the baffle members 34 and the barrier members 32. The grain will then continue to fall downwardly into contact with the first sloped side wall 24 of the bin 10 and downwardly further through the bottom opening 12 of the bin 10. Grain dust generated by the falling grain tends to travel to the left within the bin 10, since its upward path to the right is generally blocked by falling grain and closed baffle units 28. The dust then tends to strike the second sloped side wall 26, travel upwardly into contact with the closed metering and dump sections 60 and 62, and then flow to the right against the curtain 48 positioned at the edge of the baffle sections 28. The curtain 48 causes the dust to flow downwardly such that it recirculates and is confined within the left side of the bin 10 so that the dust does not flow back upwardly to the right toward the baffle units 28.

This embodiment has the advantage of generally reducing the emission of dust from the bin 10 when grain is unloaded at either high or low flow rates. This embodiment therefore allows the same grain bin to be utilized for both high and low flow rate unloading. Separate bins are therefore not required. When grain is unloaded at low flow rates, the metering units 60, dump units 62 and sensors 64 operate to establish a choke load which tends to reduce the emission of dust from the bin 10. When grain is unloaded at high flow rates, such as when the tailgate is opened and the bed 50 is tilted up for rapid unloading, the metering and dump units 60 and 62 positioned across the second portion 46 of the bin opening 12 can be controlled to remain closed, and the metering and dump units 60 and 62 above the baffle units 28 and first portion 30 of the bin opening 12 can be opened. In the high flow rate mode of operation, the circulation of air and dust within the bin 10 established by the interaction of the sloped side walls 24 and 26, closed metering and dump units 60 and 62, and curtain 48 serve to generally hinder the emission of grain dust from the bin 10, as does the particular construction of the baffle units 28.

Figure 11:
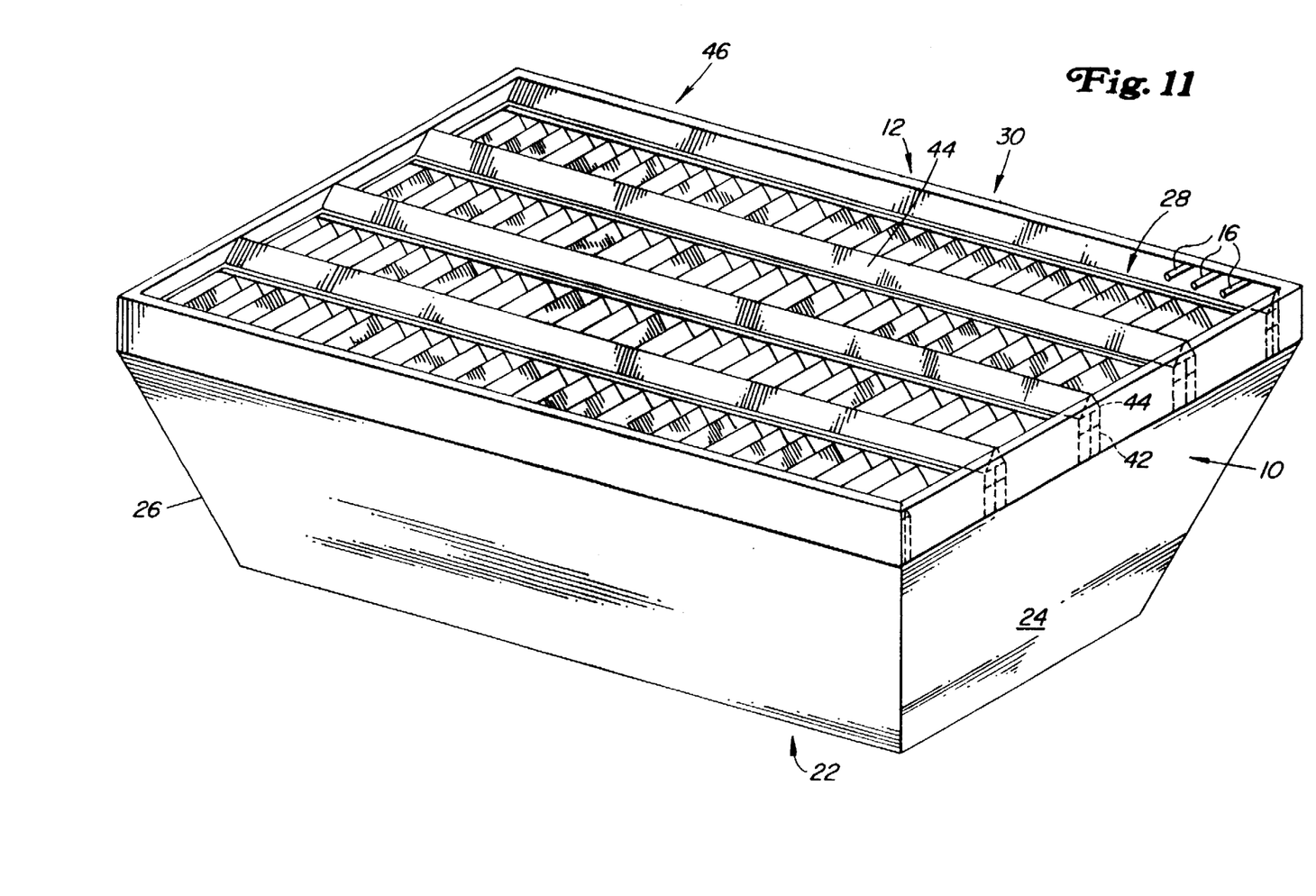
FIG. 11 is another alternative embodiment of the present invention having baffle units extending across the entire top opening of a grain bin.

It is also feasible to provide baffle units 28 as described above which effectively cover the entire top opening 12 of a bin as is shown in FIG. 11. When grain is unloaded from a truck 18 at high flow rates, the baffle units 28 will open as grain contacts the particular baffles 34. The baffles 34 that are not contacted by grain remain closed and therefore block grain dust from passing upwardly out of the bin 10 through the top opening 12 of the bin 10. The baffles 34 will open in response to being contacted by grain. If a large amount of grain contacts a particular baffle 34, it will swing open a relatively large distance. But if only a small amount of grain contacts the baffle it will swing open only a relatively small distance. Each baffle 34 will therefore tend to open only as far as necessary to let the grain contacting it through. The baffle units 28 will then promptly close after the grain passes through. The structure of the baffle sections 28 themselves function to block the flow of grain upwardly through the top opening 12 of the bin 10.

The baffle sections 28 according to the present invention are relatively simple in construction and therefore relatively inexpensive to manufacture. According to the preferred embodiment of the present invention, the baffles 34 are biased to their vertical orientation, which is their closed position, merely by the weight of the baffle 34. Gravity causes the baffle 34 to swing back to its closed position as soon as grain is no longer contacting the baffle 34. Therefore, more complex and costly spring mechanisms are not required by the preferred embodiments of the present invention.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A mechanism for reducing the emission of dust from a grain collecting container into which grain is dumped from other containers such as trucks, comprising:

a plurality of baffle units positioned over the grain collecting container, the baffle units being adapted to assume an open mode for allowing grain from the other container to pass through the baffle units and into the grain collecting container as the grain contacts the baffle units, the baffle units also being adapted to assume a closed mode when grain from the other container is not contacting the baffle units and thereby prevent dust from the grain collecting container from passing through the baffle units, each of the baffle units further comprising:

a barrier member which extends diagonally upwardly and has a fixed position near the top portion of the grain collecting container, a baffle member swingable about a pivot axis located proximate a top portion of the barrier member, the baffle member being biased to a generally vertical closed mode whereat the lower portion of the baffle member is positioned proximate another adjacent barrier member for generally closing the baffle member against the other adjacent barrier member for generally preventing dust from within the grain collecting container from passing upwardly past the baffle unit, the baffle member being swingable against the bias to an open mode when grain dumped from the other container contacts the baffle member, and in the open mode the baffle swings from the vertical position to a position whereat the grain from the other container is allowed to travel past the baffle unit and into the grain collecting container.

2. The invention of claim 1, wherein the baffle member is biased toward the generally vertical closed mode solely by the weight of the baffle member.

3. The invention of claim 1, and further comprising a rod member to which the baffle member is fixed, the rod member defining the pivot axis about which the baffle member swings between the open and closed modes, and the rod member is operatively pivotably supported with respect to the grain collection container.

4. The invention of claim 1, wherein the upper portion of the barrier member extends generally directly over the baffle member for generally shielding the upper portion of the baffle member from grain being dumped from the other container.

5. The invention of claim 2, wherein the upper portion of the barrier member extends generally directly over the baffle member for generally shielding the upper portion of the baffle member from grain being dumped from the other container.

6. The invention of claim 1, wherein the baffle units are positioned within a first section of the top portion of the grain collecting container, and the first section is approximately the size of an opening in the other container through which the grain is dumped at relatively high flow rates, a second section of the top portion of the grain collecting container remains closed as grain is dumped from the other container into the grain collecting container, and a curtain extends downwardly from the top portion of the grain collecting container and is positioned generally between the first and second sections.

7. The invention of claim 6, wherein the grain collecting container includes inwardly sloping walls which extend downwardly and inwardly toward an outlet in the grain collecting container, and the first section is positioned generally directly above one of the inwardly sloping walls of the grain collecting container.

8. The invention of claim 6, wherein the baffle member is biased toward the vertical closed mode solely by the weight of the baffle member.

9. The invention of claim 6, and further comprising a rod member to which the baffle member is fixed, the rod member defining the pivot axis about which the baffle member swings between the open and closed modes, the rod member being operatively pivotably supported with respect to the grain collection container.

10. The invention of claim 6, wherein the upper portion of the barrier member extends generally directly over the baffle member for generally shielding the upper portion of the baffle member from grain dumped onto the baffle units from the other container.

11. The invention of claim 10, and further comprising a rod member to which the baffle member is fixed, the rod member defining the pivot axis about which the baffle member swings between the open and closed modes, the rod members being operatively pivotably supported with respect to the grain collection container.

12. The invention of claim 11, wherein said grain collecting container includes inwardly sloping walls which extend downwardly and inwardly toward an outlet in the grain collecting container, and the first section is positioned generally directly above one of the inwardly sloping walls of the grain collecting container.

13. The invention of claim 12, wherein the baffle member is biased toward the vertical closed mode solely by the weight of the baffle member.

14. The invention of claim 6, and further comprising:
   a plurality of metering units and dumping units each including louvers and means for opening and closing said louvers, the metering and dumping units being positioned to form a lid across the top portion of the grain collecting container, the metering and dumping units being proximate the baffle units, and
   the metering units further comprise a sensor that generates a signal when grain dumped from the other container is present on said louvers, and means responsive to a signal from the sensor to open the louvers on the metering unit after a predetermined time lapse.

15. The invention of claim 14, and further comprising means for generating a signal sent to the metering and dump units for opening all the louvers.

16. The invention of claim 15, and further comprising means for generating a subsequent signal sent to the units to close all of the louvers whereby dust is prevented from escaping from the grain collecting container past the louvers.

17. The invention of claim 16, wherein the upper portion of the barrier member extends generally directly over the baffle member for generally shielding the upper portion of the baffle member from grain being dumped from the other container.

18. The invention of claim 17, and further comprising a rod member to which the baffle member is fixed, the rod member defining the pivot axis about which the baffle member swings between the open and closed modes, the rod members being operatively pivotably supported with respect to the grain collection container.

19. The invention of claim 18, wherein said grain collecting container includes inwardly sloping walls which extend downwardly and inwardly toward an outlet in the grain collecting container, and the first section is positioned generally directly above one of the inwardly sloping walls of the grain collecting container.

20. The invention of claim 19, wherein the baffle member is biased toward the vertical closed mode solely by the weight of the baffle member.

21. The invention of claim 1, and further comprising:
   a plurality of metering units and dumping units each including louvers and means for opening and closing the louvers, the metering and dumping units being positioned to form a lid across the top portion of the grain collecting container, the metering and dumping units being proximate the baffle units, and
   the metering units further comprise a sensor that generates a signal when grain dumped from the other container is present on the louvers, and means responsive to a signal from the sensor to open the louvers on the metering unit after a predetermined time lapse.

22. The invention of claim 21, and further comprising means for generating a signal sent to the metering and dump units for opening all the louvers.

23. The invention of claim 22, and further comprising means for generating a subsequent signal sent to the units to close all of the louvers whereby dust is prevented from escaping from the grain collecting container past the louvers.

24. A mechanism for reducing the emission of dust from a grain collecting container into which grain is dumped from other containers such as trucks which dump grain at relatively high flow rates, comprising:
   a plurality of baffle units positioned in a first section of the top portion of the grain collecting container, the baffle units include baffle members which are adapted to open as grain from the other grain containers contacts the baffle members for allowing the grain to pass into the grain collecting container, the baffle units also being adapted to close when grain from the other container is not being dumped on the baffle units, and the first section is approximately the size of an opening in the other container through which the grain is dumped from the other container,
   a second section of the top portion of the grain collecting container which remains closed as grain is dumped from the other container into the grain collecting container, and
   a curtain extending downwardly from the top portion of the grain collecting container and is positioned between the first and second sections.

25. The invention of claim 24, wherein the grain collecting container includes inwardly sloping walls which extend downwardly and inwardly toward an outlet in the grain collecting container, and the first section is positioned generally directly above one of the inwardly sloping walls of the grain collecting container.

26. The invention of claim 24, and further comprising:
   a plurality of metering units and dumping units each including louvers and means for opening and closing the louvers, the metering and dumping units being positioned to form a lid across the top portion of the grain collecting container, and
   the metering units further comprise a sensor that generates a signal when grain dumped from the other container is present on the louvers, and means responsive to a signal from said sensor to open the louvers on the metering unit after a predetermined time lapse.

27. The invention of claim 26, and further comprising means for generating a signal sent to the metering and dump units for opening all the louvers.

28. The invention of claim 27, and further comprising means for generating a subsequent signal sent to said units to close all of the louvers whereby dust is prevented from escaping from the grain collecting container past the louvers.

29. The invention of claim 28, wherein said grain collecting container includes inwardly sloping walls which extend downwardly and inwardly toward an outlet in the grain collecting container, and the first section is positioned generally directly above one of the inwardly sloping walls of the grain collecting container.

* * * * *